US009581682B2

(12) United States Patent
Jeong et al.

(10) Patent No.: US 9,581,682 B2
(45) Date of Patent: Feb. 28, 2017

(54) FREQUENCY MODULATED CONTINUOUS WAVE RADAR DEVICE, AND OBJECT DETECTION METHOD USING CONTINUOUS WAVE THEREOF

(71) Applicant: MANDO CORPORATION, Pyeongtaek-si (KR)

(72) Inventors: Seong Hee Jeong, Yongin-si (KR); Jae Eun Lee, Seoul (KR)

(73) Assignee: MANDO CORPORATION, Pyeongtaek-Si (KR)

( * ) Notice: Subject to any disclaimer, the term of this patent is extended or adjusted under 35 U.S.C. 154(b) by 295 days.

(21) Appl. No.: 14/323,978

(22) Filed: Jul. 3, 2014

(65) Prior Publication Data
US 2015/0331090 A1 Nov. 19, 2015

(30) Foreign Application Priority Data

Jul. 5, 2013 (KR) ........................ 10-2013-0078672

(51) Int. Cl.
*G01S 13/88* (2006.01)
*G01S 7/35* (2006.01)
(Continued)

(52) U.S. Cl.
CPC ............. *G01S 7/354* (2013.01); *G01S 7/35* (2013.01); *G01S 13/32* (2013.01); *G01S 13/345* (2013.01);
(Continued)

(58) Field of Classification Search
CPC ........ G01S 13/32; G01S 13/345; G01S 13/42; G01S 13/58; G01S 13/931; G01S 2007/358; G01S 7/35; G01S 7/354
(Continued)

(56) References Cited

U.S. PATENT DOCUMENTS

| 5,757,308 A | * | 5/1998 | Lissel | G01S 13/931 342/111 |
| 6,888,494 B2 | * | 5/2005 | Tamatsu | G01S 13/345 342/109 |
| 2011/0273326 A1 | * | 11/2011 | Shirakawa | G01S 7/40 342/25 R |

FOREIGN PATENT DOCUMENTS

| CN | 1721874 | 1/2006 |
| CN | 101490578 | 7/2009 |

(Continued)

OTHER PUBLICATIONS

Office Action dated May 30, 2016 for Chinese Patent Application No. 201410319159.X and its machine translation provided by Google translate.
(Continued)

*Primary Examiner* — Timothy A Brainard
(74) *Attorney, Agent, or Firm* — Ladas & Parry, LLP

(57) ABSTRACT

Disclosed herein is a frequency modulated continuous wave (FMCW) radar device, including: a continuous wave (CW) signal generator configured to generate a transmit (Tx) CW signal; a radio frequency (RF) transmitter configured to transmit the generated Tx CW signal as an RF signal through a Tx antenna; an RF receiver configured to receive a CW signal which is reflected and returned from a forward object after the Tx CW signal is transmitted; a target detector configured to extract speed and angle using a frequency difference between the Tx CW signal and the reflected CW signal, and detect an approaching target; and a detection controller configured to control the RF transmitter to transmit the Tx CW signal as a signal having a triangular waveform in a time-frequency graph and to additionally transmit the Tx CW signal as a signal having a crossbar waveform at a predetermined frequency for a predetermined time, and extract speed and angle from the reflected CW
(Continued)

signal having a crossbar waveform so as to detect the approaching target, when the sign of the target speed extracted from the reflected CW signal having a triangular waveform is negative (−).

7 Claims, 7 Drawing Sheets

(51) Int. Cl.
*G01S 13/58* (2006.01)
*G01S 13/42* (2006.01)
*G01S 13/32* (2006.01)
*G01S 13/34* (2006.01)
*G01S 13/93* (2006.01)

(52) U.S. Cl.
CPC .............. *G01S 13/42* (2013.01); *G01S 13/58* (2013.01); *G01S 13/931* (2013.01); *G01S 2007/358* (2013.01)

(58) Field of Classification Search
USPC .......................................................... 342/83
See application file for complete search history.

(56) References Cited

FOREIGN PATENT DOCUMENTS

| CN | 102623795 | 8/2012 |
|----|-----------|--------|
| CN | 102788980 | 11/2012 |
| EP | 2098980 | 9/2009 |
| KR | 10-1083660 | 11/2011 |

OTHER PUBLICATIONS

"Radar sensor function Application Notes" 24GHz radar antenna planar, Technical Support Handbook I V 1.0, Jun. 2012 and its machine translation provided by Google translate.

* cited by examiner (a)

(b)

FREQUENCY MODULATED CONTINUOUS WAVE RADAR DEVICE, AND OBJECT DETECTION METHOD USING CONTINUOUS WAVE THEREOF

CROSS-REFERENCE TO RELATED APPLICATION

This application claims priority to Korean Patent Application No. 10-2013-0078672 filed on Jul. 5, 2013, the disclosure of which is hereby incorporated by reference in its entirety.

FIELD OF THE INVENTION

Exemplary embodiments of the present invention relate to an object detection device and method using a frequency modulated continuous wave (FMCW) radar device, and more particularly, to an FMCW radar device which additionally transmits a continuous wave (CW) radar signal to extract accurate speed through a received signal, when a forward vehicle followed by a vehicle suddenly stops so that the interval between the vehicles momentarily decreases, and extracts the angle of the received signal such that the extracted angle is utilized as detection information, and an object detection method using continuous waves thereof.

BACKGROUND OF THE INVENTION

Conventionally, an adaptive cruise control (ACC) radar has been used in the case where a vehicle follows a forward vehicle with a predetermined distance therebetween as illustrated in FIG. 1. However, the requirements for the radar device have been increased. Thus, when the forward vehicle suddenly stops so that the interval between the vehicles momentarily decreases, the target may not be easily detected only through the radar device. FIG. 2 is a graph illustrating a transmit (Tx) signal and a receive (Rx) signal of an FMCW radar device. Theoretically, only a frequency difference between the Tx signal and the Rx signal must be extracted as illustrated in FIG. 3. Due to the characteristic of the radar, however, the radar directly mixes the Tx signal and the Rx signal to extract the best signal. Thus, a large DC component may exist as illustrated in FIGS. 4 and 5. In the case of a short-distance object as illustrated in FIG. 4, however, when the frequency is moved toward the DC component region due to a speed difference, the signal cannot be extracted. In this case, the radar may miss the target. That is, the control distance of the radar may be limited.

Furthermore, when an in-phase (I) channel and a quadrature (Q) channel exist for each channel in a receiver circuit of the radar device, the sign of speed may be extracted through phase information. However, when I/Q channels do not exist for each channel, the sign of frequency is extracted as only a positive value corresponding to an absolute value as illustrated in FIG. 3. In this case, since phase components are not detected in case of short distance and high speed, there exists a frequency region in which the target cannot be detected.

(Patent Document 1) Korean Patent No. 1,083,660 registered on Nov.9, 2011.

SUMMARY OF THE INVENTION

The present invention has been made in view of the above problems, and it is an object of the present invention to provide a frequency modulated continuous wave (FMCW) radar device which additionally transmits a continuous wave (CW) radar signal to extract accurate speed through a received signal, when a forward vehicle followed by a vehicle suddenly stops so that the interval between the vehicles momentarily decreases, and extracts the angle of the received signal such that the extracted angle is utilized as detection information.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a frequency modulated continuous wave (FMCW) radar device may include: a continuous wave (CW) signal generator configured to generate a transmit (Tx) CW signal; a radio frequency (RF) transmitter configured to transmit the generated Tx CW signal as an RF signal through a Tx antenna; an RF receiver configured to receive a reflected CW signal which is reflected and returned from a forward object after the Tx CW signal is transmitted; a target detector configured to extract speed and angle using a frequency difference between the Tx CW signal and the reflected CW signal, and detect an approaching target; and a detection controller configured to control the RF transmitter to transmit the Tx CW signal as a signal having a triangular waveform in a time-frequency graph and to additionally transmit the Tx CW signal as a signal having a crossbar waveform at a predetermined frequency for a predetermined time, and extract speed and angle from the reflected CW signal having a crossbar waveform so as to detect the approaching target, when the sign of the target speed extracted from the reflected CW signal having a triangular waveform is negative (-).

When an in-phase (I) channel and a quadrature (Q) channel exist for each channel, the target detector may extract the sign of the target speed through phase information of the reflected CW signal.

The CW signal generator may include a direct digital synthesizer (DDS) and a local oscillator for generating the Tx CW signal having a triangular waveform and the Tx CW signal having a crossbar waveform.

In accordance with another aspect of the present invention, there is provided an object detection method using continuous waves of an FMCW radar device including a CW signal generator, an RF transmitter, an RF receiver, a target detector, and a detection controller. The object detection method may include: generating, by the CW signal generator, a Tx CW signal having a triangular waveform; transmitting, by the detection controller, the Tx CW signal having a triangular waveform as an RF signal through the RF transmitter; generating, by the CW signal generator, a Tx CW signal having a crossbar waveform; transmitting, by the detection controller, the Tx CW signal having a crossbar waveform as an RF signal through the RF transmitter; sequentially receiving, by the RF receiver, a triangular-waveform reflected CW signal and a crossbar-waveform reflected CW signal which are reflected and returned after the Tx CW signals are transmitted; extracting, by the target detector, the sign of target speed from the reflected CW signal having a triangular waveform; and extracting, by the target detector, speed and angle from the reflected CW signal having a crossbar waveform to detect an approaching target, when the sign of the target speed is negative (-).

In the extracting of the sign of the target speed, the target detector may extract the sign of the target speed through phase information of the reflected CW signal, when an in-phase (I) channel and a quadrature (Q) channel exist for each channel.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
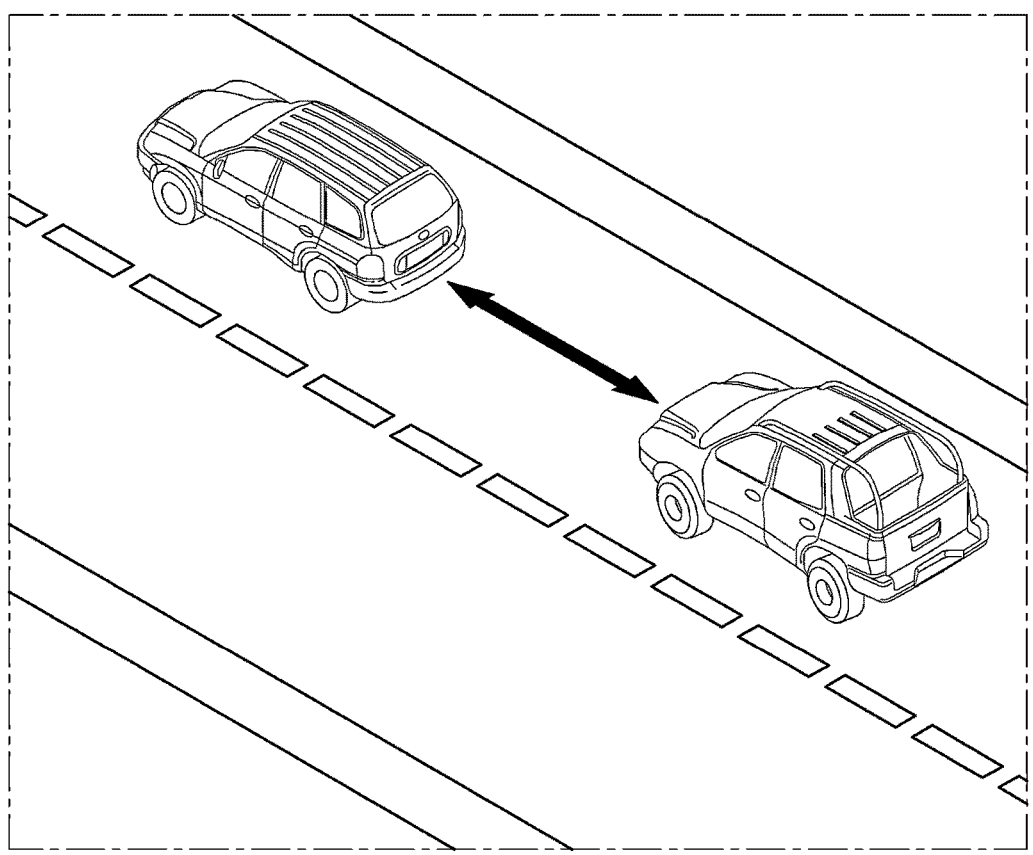
FIG. 1 is a diagram illustrating a case in which a vehicle follows a forward vehicle with a predetermined distance therebetween.
Figure 2:
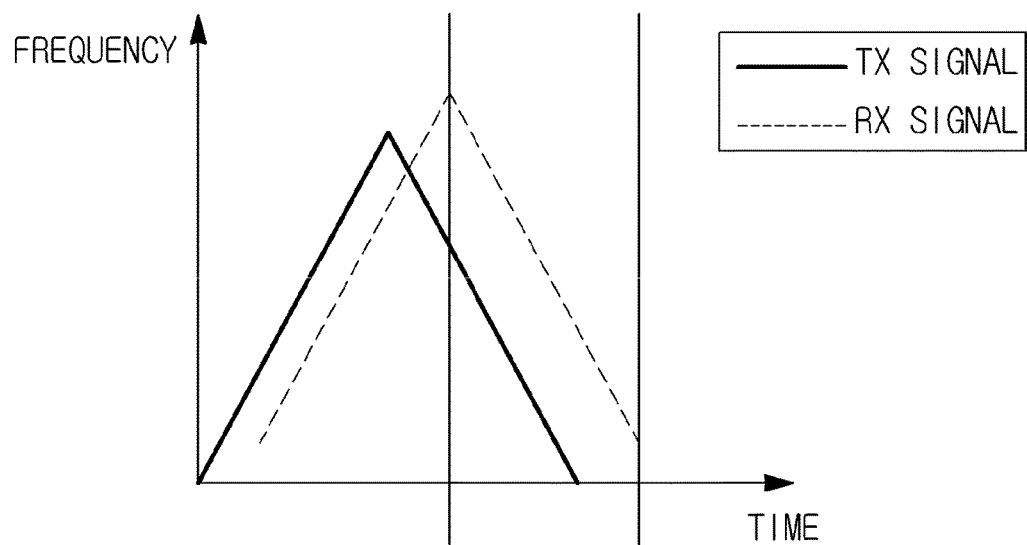
FIG. 2 is a graph illustrating Tx signals and Rx signals of an FMCW radar device.

The present invention may be modified in various forms and include various embodiments, and specific embodiments of the present invention will be described in detail with reference to the accompanying drawings. However, the present invention is not limited to the specific embodiments, and may include all modifications, equivalents, and substitutes within the spirit and scope of the present invention.

Hereinafter, a frequency modulated continuous wave (FMCW) radar device and an object detection method using continuous waves thereof will be described in detail with reference to the accompanying drawings. In the drawings, like reference numerals denote the same or corresponding elements, and the detailed descriptions thereof are omitted.

Figure 6:
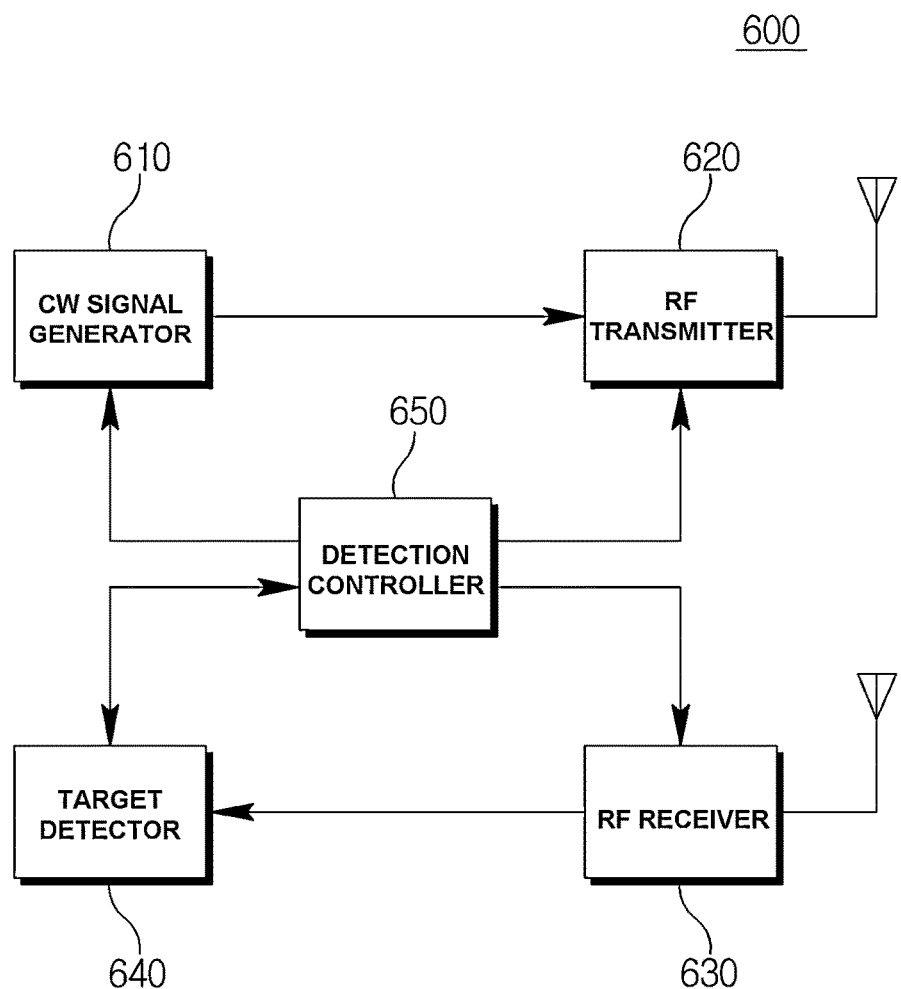
FIG. 6 is a configuration diagram illustrating function blocks of an FMCW radar device according to an embodiment of the present invention.

FIG. 6 is a configuration diagram illustrating function blocks of an FMCW radar device according to an embodiment of the present invention.

Referring to FIG. 6, the FMCW radar device 600 according to the embodiment of the present invention includes a continuous wave (CW) signal generator 610, a radio frequency (RF) transmitter 620, an RF receiver 630, a target detector 640, and a detection controller 650.

The CW signal generator 610 generates a CW signal to transmit to an object (target) in front of a vehicle.

At this time, the CW signal generator 610 may include a direct digital synthesizer (DDS) and a local oscillator for generating a transmit (Tx) CW signal having a triangular waveform and a Tx CW signal having a crossbar waveform.

The RF transmitter 620 transmits the generated Tx CW signal as an RF signal through a Tx antenna. The RF transmitter 620 may include a digital-to-analog (D/A) converter to convert a digital signal into an analog signal.

The RF receiver 630 receives a CW signal which is reflected and returned from the object in front of the vehicle, after the Tx CW signal is transmitted. The RF receiver 630 may include an analog-to-digital (A/D) converter to convert the received analog signal to a digital signal.

The target detector 640 extracts speed and angle using a frequency difference between the Tx CW signal and the reflected CW signal, and detects the approaching target.

When an in-phase (I) channel and a quadrature (Q) channel exist for each channel, the target detector 640 extracts the sign of the target speed through phase information of the reflected CW signal.

The detection controller 650 controls the RF transmitter to transmit the Tx CW signal as a signal having a triangular waveform in a time-frequency graph and to additionally transmit the Tx CW signal as a signal having a crossbar waveform at a predetermined frequency for a predetermined time, and extracts speed and angle from the reflected CW signal having a crossbar waveform so as to detect the approaching target, when the sign of the target speed extracted from the reflected CW signal having a triangular waveform is negative (−).

Figure 7:
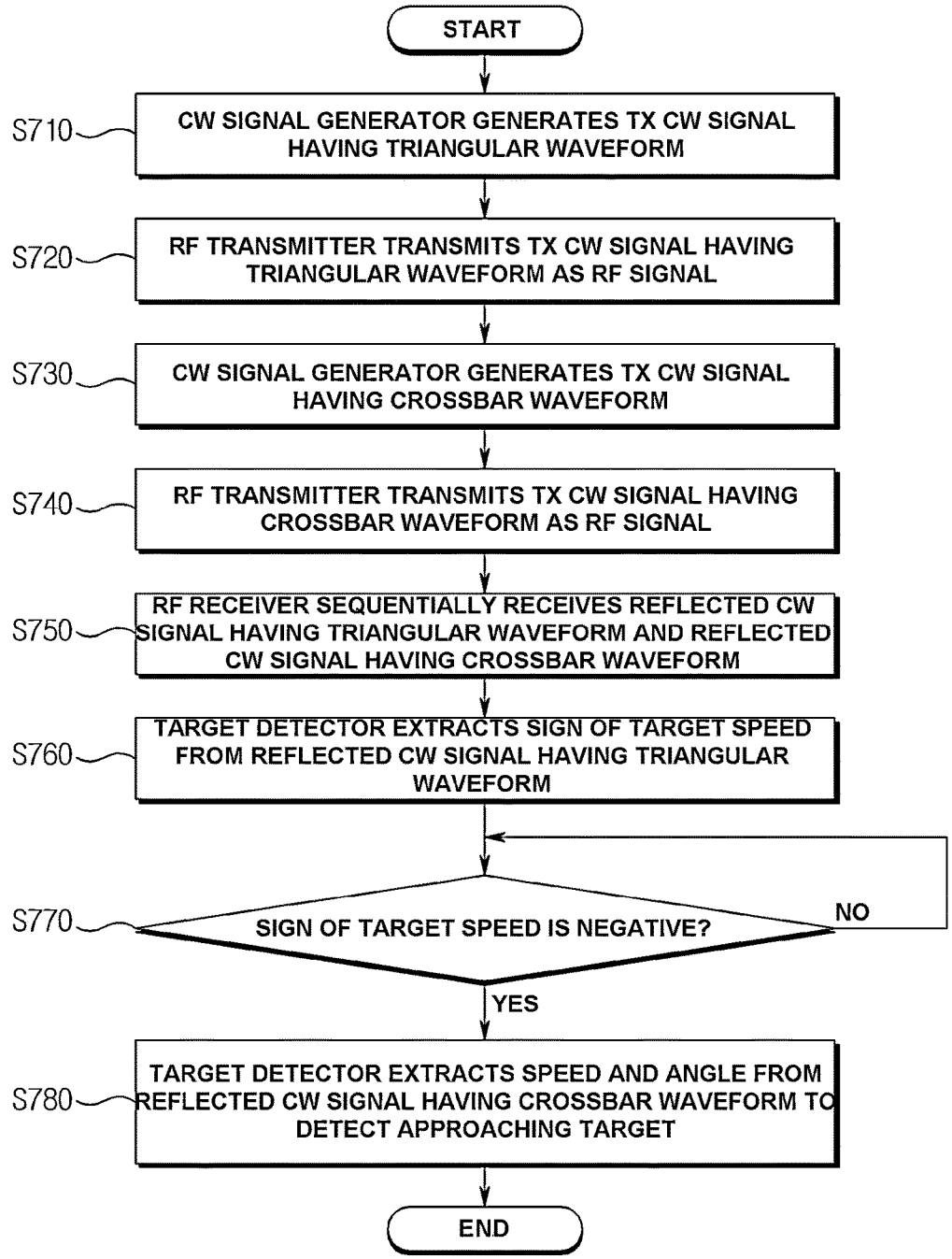
FIG. 7 is a flowchart for explaining an object detection method using continuous waves of the FMCW radar device according to the embodiment of the present invention.

FIG. 7 is a flowchart for explaining an object detection method using continuous waves of the FMCW radar device according to the embodiment of the present invention.

Figure 8:
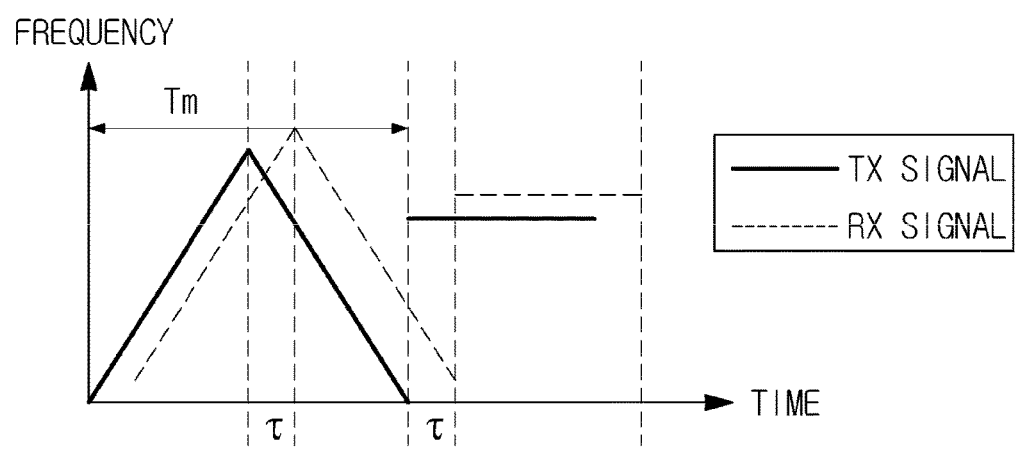
FIG. 8 is a time-frequency graph illustrating a CW signal having a triangular waveform and a CW signal having a crossbar waveform according to the embodiment of the present invention.

Referring to FIG. 7, the CW signal generator 610 of the FMCW radar device 600 according to the embodiment of the present invention generates a Tx CW signal having a triangular waveform as illustrated in FIG. 8, at step S710. The CW signal generator 610 may generate the Tx CW signal in a sawtooth waveform as well as the triangular waveform. FIG. 8 is a time-frequency graph illustrating CW signals having a triangular waveform and CW signals having a crossbar waveform according to the embodiment of the present invention. As illustrated in FIG. 8, the CW signal generator 610 first generates a Tx CW signal having a triangular waveform, and then generates a Tx CW signal having a crossbar waveform at a predetermined frequency according to the control of the detection controller 650.

The FMCW radar device 600 according to the embodiment of the present invention may use a DDS as well as a voltage controlled oscillator (VCO), as a signal generation source. Thus, the FMCW radar device 600 may variably control the waveform according to a distance from an approaching target and the speed and size of the approaching target. When the intensity of the reflected signal is weak because the target is positioned at a long distance or has a small size, the FMCW radar device 600 may process data for a longer modulation time, and increase average power of the reflected signal, thereby increasing the detection probability. Furthermore, when the approaching target moves at low speed, it is difficult to determine whether the target is approaching. In this case, the FMCW radar device 600 may decrease the modulation bandwidth by reducing the modulation time, thereby increasing the detection probability.

The detection controller 650 transmits the Tx CW signal having a triangular waveform as an RF signal through the RF transmitter 620 at step S720.

The CW signal generator 610 generates a Tx CW signal having a crossbar waveform as illustrated in FIG. 8, at step S730.

The detection controller 650 transmits the Tx CW signal having a crossbar waveform as an RF signal through the RF transmitter 620 at step S740.

The RF receiver 630 sequentially receives a triangular-waveform CW signal and a crossbar-waveform CW signal, which are reflected and returned after the Tx CW signals are transmitted, at step S750.

Figure 9:
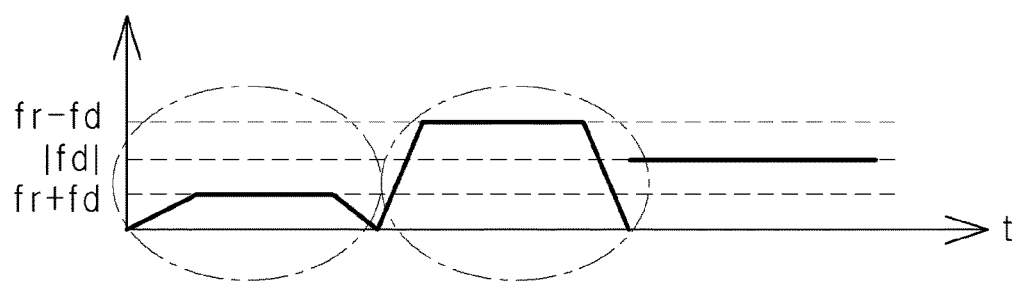
FIG. 9 is a graph illustrating the waveform of a beat signal corresponding to a frequency difference between a Tx CW signal and a reflected CW signal according to the embodiment of the present invention.

Thus, the target detector 640 may acquire a beat signal corresponding to a frequency difference between the Tx CW signal and the reflected CW signal, as illustrated in FIG. 9. FIG. 9 is a graph illustrating the waveform of the beat signal corresponding to the frequency difference between the Tx CW signal and the reflected CW signal according to the embodiment of the present invention.

Then, the target detector 640 extracts the sign of target speed from the reflected CW signal having a triangular waveform at step S760.

At this time, when an in-phase (I) channel and a quadrature (Q) channel exist for each channel, the target detector 640 extracts the sign of the target speed through the phase information of the reflected CW signal.

When it is determined at step S770 that the sign of the target speed is negative (−), the target detector 640 extracts speed and angle from the reflected CW signal having a crossbar waveform, and detects an approaching target at step S780.

Figure 3:
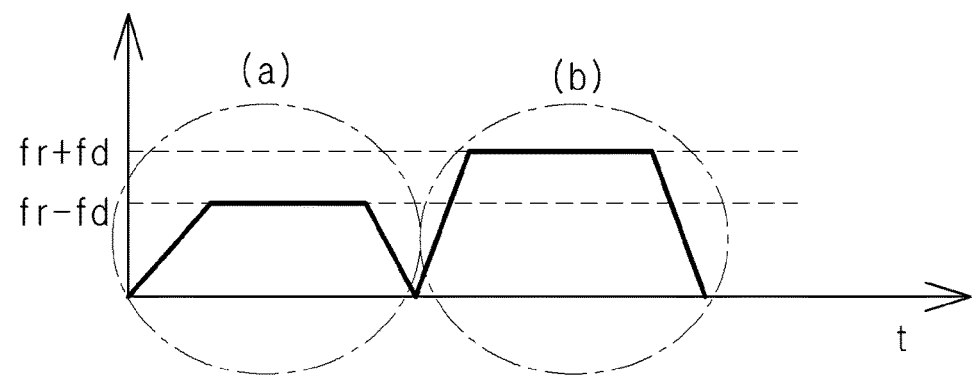
FIG. 3 is a graph illustrating a frequency difference between a Tx signal and an Rx signal of the FMCW radar device.
Figure 4:
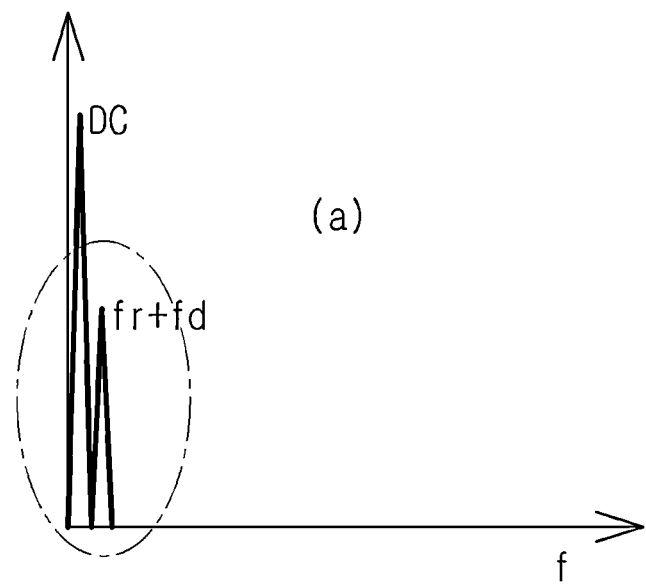
FIGS. 4 and 5 are graphs illustrating a case in which a DC component caused by up/down chirp exists during frequency modulation of the FMCW radar device.
Figure 5:
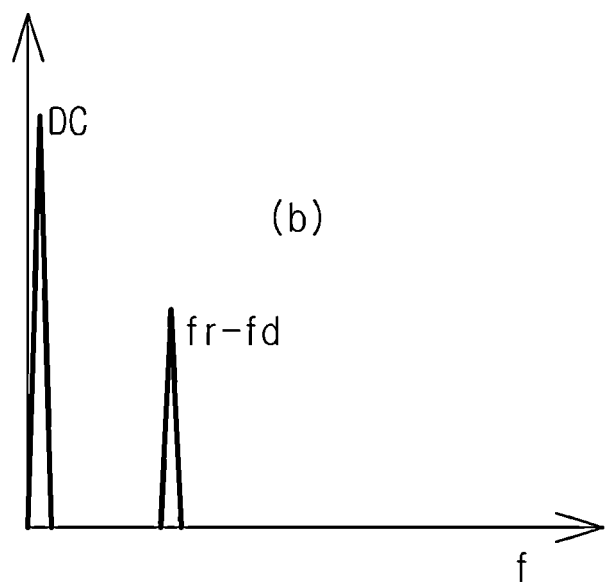

When the target is at a short distance and the sign of the target speed is negative (−), the absolute value of the extracted frequency decreases as illustrated in FIG. 3. Thus, the frequency becomes close to the DC component region. Thus, since the reflected CW signal is affected by the DC component in the case of FIG. 3, no frequency may be extracted. Thus, the target detector 640 cannot detect the target.

Figure 10:
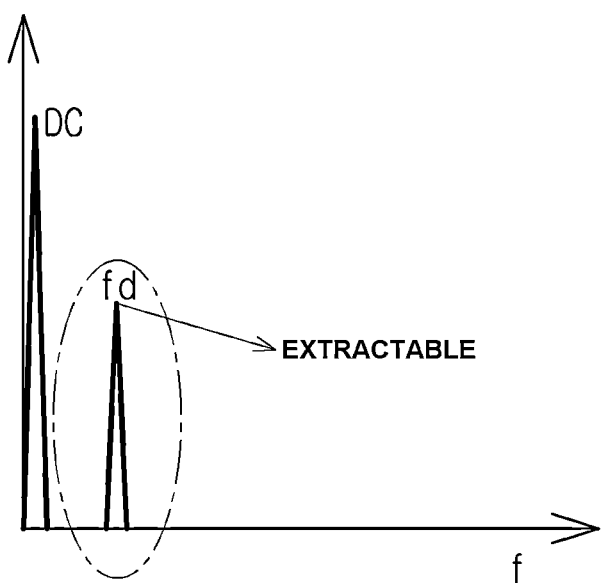
FIG. 10 is a graph illustrating the CW signal having a crossbar waveform, from which speed and angle may be extracted even though a DC component exists, according to the embodiment of the present invention.

However, as the RF receiver 630 receives the reflected CW signal having a crossbar waveform, the target detector 640 extracts accurate speed from the reflected CW signal having a crossbar waveform as illustrated in FIG. 10. Then, the target detector 640 extracts an angle from the reflected CW signal having a crossbar waveform, and utilizes the extracted angle as detection information to detect the target. FIG. 10 is a graph illustrating the CW signal having a crossbar waveform, from which speed and angle may be extracted even though a DC component exists, according to the embodiment of the present invention.

The distance from the forward vehicle may be calculated on the basis of the CW signal having a triangular waveform as illustrated in FIG. 8. In FIG. 8, Tm represents a frequency sweep cycle, and τ represents an Rx delay time depending on the distance from the target. Here, a stationary target is taken as an example of the target. Thus, the beat frequency $f_b$ may be calculated as expressed by Equation 1 below.

$$f_b = \frac{2 \cdot B \cdot R}{c \cdot T_m} \quad \text{[Equation 1]}$$

At this time, c represents the speed of light, B represents a bandwidth, and R represents a distance. That is, the beat frequency $f_b$ is proportional to the distance and bandwidth, and inversely proportional to the cycle.

In order to calculate a beat frequency from the beat signal corresponding to the difference between the Tx CW signal and the reflected CW signal, a fast Fourier transform (FFT) algorithm may be used. When an FFT point is represented by N and a sampling frequency is represented by fs, a frequency interval Δf corresponds to fs/N. Therefore, the distance R which can be detected may be calculated as expressed by Equation 2.

$$R = \frac{c \cdot T_m \cdot \Delta f}{2 \cdot B} \quad \text{[Equation 2]}$$

When track information based on an existing detection result exists in a situation where the forward vehicle suddenly stops, the FMCW radar device and the object detection method according to the embodiment of the present invention may update the detection information by matching the speed and angle information extracted from the reflected CW signal having a crossbar waveform, even through a detection impossible case occurs due to a DC component or low-frequency noise in up/down chirp. Thus, the FMCW radar device and the object detection method may continuously follow the target, and increase the stability by stopping the vehicle, if necessary.

According to the embodiment of the present invention, when a forward vehicle followed by a vehicle suddenly stops so that the interval between the vehicles momentarily decreases, the FMCW radar device and the object detection method may additionally transmit a CW radar signal and extract accurate speed based on a received signal. Then, the FMCW radar device and the object detection method may extract the angle of the received signal and utilize the extracted angle as detection information.

In other words, even when a forward vehicle followed by a vehicle suddenly stops so that the interval between the vehicles momentarily decreases, the FMCW radar device and the object detection method may track a target, which could not be detected by the conventional FMCW radar device, and detect the target. Thus, the FMCW radar device and the object detection method may prevent a collision during a sudden stop, thereby increasing a drivers stability.

While the present invention has been described with respect to the specific embodiments, it will be apparent to those skilled in the art that various changes and modifications may be made without departing from the spirit and scope of the invention as defined in the following claims.

What is claimed is:

1. A frequency modulated continuous wave (FMCW) radar device, comprising:
   a continuous wave (CW) signal generator configured to generate a transmit (Tx) CW signal;
   a radio frequency (RF) transmitter configured to transmit the generated Tx CW signal as an RF signal through a Tx antenna;
   an RF receiver configured to receive a reflected CW signal which is reflected and returned from a forward object after the Tx CW signal is transmitted;
   a target detector configured to extract speed and angle using a frequency difference between the Tx CW signal and the reflected CW signal, and detect an approaching target; and a detection controller configured to control the RF transmitter to transmit the Tx CW signal as a signal having a triangular waveform in a time-frequency graph and to additionally transmit the Tx CW signal as a signal having a crossbar waveform at a predetermined frequency for a predetermined time, extract speed and angle from the reflected CW signal having a crossbar waveform so as to detect the approaching target, when the sign of the target speed extracted from the reflected CW signal having a triangular waveform is negative (−), and extract speed and angle from the reflected CW signal having the triangular waveform so as to detect the target, when the sign of the target speed extracted from the reflected CW signal having the triangular waveform is not negative (−).

2. The FMCW radar device according to claim 1, wherein when an in-phase (I) channel and a quadrature (Q) channel exist for each channel, the target detector extracts the sign of the target speed through phase information of the reflected CW signal.

3. The FMCW radar device according to claim 1, wherein the CW signal generator comprises a direct digital synthesizer (DDS) and a local oscillator for generating the Tx CW signal having a triangular waveform and the Tx CW signal having a crossbar waveform.

4. The FMCW radar device of claim 1, wherein the RF transmitter is configured to transmit the signal having triangular waveform and the signal having the crossbar waveform which has a frequency between minimum and maximum frequencies of the triangular waveform.

5. An object detection method using continuous waves of an FMCW radar device including a CW signal generator, an RF transmitter, an RF receiver, a target detector, and a detection controller, the object detection method comprising:

generating, by the CW signal generator, a Tx CW signal having a triangular waveform;

transmitting, by the detection controller, the Tx CW signal having a triangular waveform as an RF signal through the RF transmitter;

generating, by the CW signal generator, a Tx CW signal having a crossbar waveform;

transmitting, by the detection controller, the Tx CW signal having a crossbar waveform as an RF signal through the RF transmitter;

sequentially receiving, by the RF receiver, a triangular-waveform reflected CW signal and a crossbar-waveform reflected CW signal which are reflected and returned after the Tx CW signals are transmitted;

extracting, by the target detector, the sign of target speed from the reflected CW signal having a triangular waveform;

extracting, by the target detector, speed and angle from the reflected CW signal having a crossbar waveform to detect an approaching target, when the sign of the target speed is negative (−); and extracting, by the target detector, speed and angle from the reflected CW signal having the triangular waveform to detect a target, when the sign of the target speed is not negative (−).

6. The object detection method according to claim 5, wherein in the extracting of the sign of the target speed, the target detector extracts the sign of the target speed through phase information of the reflected CW signal, when an in-phase (I) channel and a quadrature (Q) channel exist for each channel.

7. The object detection method of claim 5, wherein the RF transmitter transmits the signal having triangular waveform and the signal having the crossbar waveform which has a frequency between minimum and maximum frequencies of the triangular waveform.

\* \* \* \* \*